(12) United States Patent
Petitjean

(10) Patent No.: US 8,376,262 B2
(45) Date of Patent: Feb. 19, 2013

(54) AEROPLANE WITH IMPROVED ACOUSTIC COMFORT

(75) Inventor: Benoit Petitjean, Chanville (FR)

(73) Assignee: European Aeronautic Defence and Space Company EADS France, Paris (FR)

( * ) Notice: Subject to any disclaimer, the term of this patent is extended or adjusted under 35 U.S.C. 154(b) by 206 days.

(21) Appl. No.: 12/668,118

(22) PCT Filed: Jul. 9, 2008

(86) PCT No.: PCT/EP2008/058891
§ 371 (c)(1),
(2), (4) Date: Jun. 15, 2010

(87) PCT Pub. No.: WO2009/007387
PCT Pub. Date: Jan. 15, 2009

(65) Prior Publication Data
US 2010/0252677 A1    Oct. 7, 2010

(30) Foreign Application Priority Data

Jul. 10, 2007  (FR) ..................... 07 04987

(51) Int. Cl.
*B64C 1/40* (2006.01)

(52) U.S. Cl. ..................... 244/1 N; 244/118.5

(58) Field of Classification Search ............... 244/1 N, 244/118.5, 119, 121, 129.1, 133; 381/71.4; 181/210, 290, 291
See application file for complete search history.

(56) References Cited

U.S. PATENT DOCUMENTS

| | | | |
|---|---|---|---|
| 5,568,557 A * | 10/1996 | Ross et al. | 381/71.11 |
| 6,078,673 A | 6/2000 | Von Flotow | |
| 6,181,797 B1 | 1/2001 | Parrella | |
| 6,343,127 B1 * | 1/2002 | Billoud | 381/71.4 |
| 2005/0238179 A1 * | 10/2005 | Erdmann | 381/71.4 |
| 2008/0019536 A1 * | 1/2008 | Marrot | 381/71.4 |
| 2009/0173571 A1 * | 7/2009 | Keller | 181/292 |

FOREIGN PATENT DOCUMENTS

| | | |
|---|---|---|
| FR | 2704084 | 10/1994 |
| WO | WO 98/16916 | 4/1998 |
| WO | WO 00/36590 | 6/2000 |

OTHER PUBLICATIONS

International Search Report dated Sep. 17, 2008.

* cited by examiner

*Primary Examiner* — Timothy D Collins
*Assistant Examiner* — Jamie S Stehle
(74) *Attorney, Agent, or Firm* — RatnerPrestia

(57) ABSTRACT

An aircraft includes a cabin in which at least part of the space is demarcated by trim panels and the cabin is provided with a system for the active control of ambient noise. Each trim panel is either an active panel including actuators powered by the active noise control system or a passive panel without such actuators. In addition, the trim panels of the cabin of the one type, either active or passive, are mechanically interchangeable with a panel of the other type, either passive or active, respectively. Power supply wiring for active panels is installed in the aircraft, this wiring being capable of powering all active panels which could be installed, whether said active panels are actually installed or whether interchangeable passive panels are installed. Finally, a power supply system for the active panels is installed in the aircraft and connected to the power supply wiring of the active panels.

5 Claims, 3 Drawing Sheets

AEROPLANE WITH IMPROVED ACOUSTIC COMFORT

This application claims priority of PCT International Application No. PCT/EP2008/058891 filed on Jul. 9, 2008. The contents of which are incorporated herein by reference.

FIELD OF THE INVENTION

The present invention relates to the field of transport aircraft.

BACKGROUND

In particular, the invention deals with aircraft for which acoustic comfort, that is to say a level of noise which is as low as possible, is desired in areas where people, namely passengers or members of the crew, are located during the flight. The invention relates more particularly to aircraft for which acoustic comfort which can easily be modified in various areas is desired without compromising the equipment and fittings of the aircraft.

In an aircraft, various sources of noise emission create background noise in the areas occupied by people, namely passenger cabin areas or a crew station, which may, depending on the case, be considered to be a source of discomfort or irritation or even, in extreme cases, a source of tiredness.

Of the noise most frequently identified, noise originating from the engines, external aerodynamic noise and internal noise, in particular linked to air conditioning and equipment ventilation systems, may be mentioned.

In order to reduce the level of noise in a given area, the most common solution consists in employing materials which have what are known as acoustic absorption properties on the walls of the area, that is to say materials which have the effect of reducing the intensity of sound waves by causing accelerated damping of said waves.

Such materials, for example glass wool in the form of a blanket, are generally used in aircraft in the walls of the cabins between the structural lining of the fuselage and the trim panels of the cabin.

In this type of arrangement, the blanket containing glass wool plays a double role of thermal insulator and acoustic absorber and the trim panels protect the blanket and improve the appearance of the cabin.

However, this solution only improves the acoustic comfort to a limited degree because certain frequencies, in particular low frequencies in the audible range, cannot be effectively absorbed without utilizing large quantities of absorbent materials, this being unacceptable on board an aircraft due to weight and volume restrictions which characterize the design of aircraft.

Another known method for reducing the level of noise in spaces in general and in a cabin in particular is known by the expression active noise control.

Active noise control consists in measuring the ambient noise and generating a canceling noise by controlling the amplitude and phase of the canceling noise.

In order to generate the canceling noise, the solution consists in arranging in the space in which the noise level is to be reduced, for example a cabin, loudspeakers which are supplied in phase and intensity in order to generate sound waves which reduce by interference the level of sound energy in chosen areas of the treated space. This solution which consists in adding loudspeakers proves to be disadvantageous because of the weight and volume of the loudspeakers and the constraints of installing them.

The space in which loudspeakers can be installed is very often limited and there are thus problems of mechanical interference with other equipment and with the trim panels.

In particular, when the device for reducing noise is installed in an aircraft cabin, with the trim panels being currently designed initially without providing for the installation of a device for active noise control, mounting loudspeakers very often requires the shape of the existing trim panels to be modified in order to install the loudspeakers of the device for active noise control.

Moreover, noise reduction systems generally utilize numerous loudspeakers which cause problems in terms of cabling and electrical connections for their controls and power supplies and which also require the modification or replacement of existing trim panels and the fitting of new supports for holding the new electrical cables of the system, which cables must also be arranged respecting the severe limitations with respect to existing electrical installations for reasons of safety and good operation of the electrical systems of the aircraft.

Subsequent installation of an active noise reduction system in an existing aircraft proves to be particularly disadvantageous and requires numerous modifications which are difficult to carry out.

SUMMARY OF THE INVENTION

To avoid the drawbacks of the known solutions, the invention provides an aircraft comprising a power supply network for active trim panels, designed to supply power to a cabin configuration in which all the active trim panels envisioned in said cabin are installed, and a system for supplying power to the active panels, said power supply network and said power supply system being installed in the aircraft independently of the number of active trim panels actually installed.

For this purpose, an airplane comprising at least one cabin, at least some of the space of which is delimited by trim panels, is provided with a system for active control of ambient noise in said cabin, and:

- each trim panel of the cabin is either a panel, called an active panel, comprising actuators powered by the system for active noise control, or a panel, called a passive panel, which does not comprise such actuators;
- at least one trim panel of the cabin of the type, either active or passive, is mechanically interchangeable with a panel of the other type, either passive or active, respectively;
- cabling for supplying power to active panels and able to be connected to active panels is arranged in the aircraft such that said cabling is able to supply power to all the active panels likely to be installed in the cabin, whether said active panels are actually installed or whether interchangeable passive panels are installed;
- a system for supplying power to active panels on board the aircraft is connected to the cabling for supplying power to active panels.

Preferably, the actuators are arranged on the panels in order to make the active panels vibrate, and advantageously, in order to ensure interchangeability of the active panels and passive panels, the actuators are integrated into the thickness of the active panels, for example by producing actuators that utilize piezoelectric technology.

Preferably, the cabling supplying power to the active panels also comprises cables connecting sensors of the system for active noise control to the system supplying power to the active panels, and at least some of the sensors are secured to active panels.

In order to hold the sockets of the supply cabling for the active panels located in configurations where an active panel corresponding to a socket is replaced by a passive panel, the passive panels used to take the place of active panels comprise at least one dummy connector on which it is possible to fix the socket, for an active panel, of the cabling for supplying power to active panels.

In order to obtain the best possible modularity in terms of acoustic comfort of a cabin, each active panel is preferably mechanically interchangeable with a passive panel and vice versa.

The invention also relates to a method of modifying the acoustic comfort of an aircraft, in which at least one passive panel is replaced by a mechanically interchangeable active trim panel, said active panel then being connected to the cabling of the system for active noise control, or in which an active trim panel is disconnected from the system for active noise control and replaced by a mechanically interchangeable passive panel.

In order to supply power to the active panels optimally in a new arrangement, the system supplying power to active panels is configured depending on the active panels actually installed.

BRIEF DESCRIPTION OF THE DRAWINGS

The detailed description of an exemplary embodiment of the invention is given with reference to the figures, which show, schematically.

DETAILED DESCRIPTION

Figure 1:
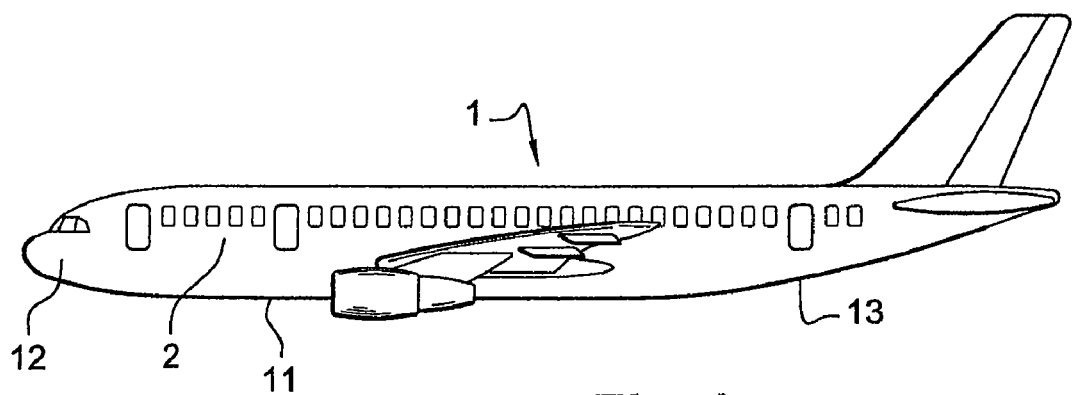
FIG. 1: a general view of an aircraft, in this case a civil transport jet airplane.

According to the invention, an aircraft 1 comprises at least one cabin 2, comprises a set of electrical cabling 3 able to be connected to trim panels of the cabin on the one hand, said trim panels being known as active on the acoustic viewpoint, and to a system 61 for supplying power to active panels on the other hand, and comprises a set of cabin trim panels, it being possible for said trim panels to be active 4 or passive 5, that is to say not active.

Figure 3:
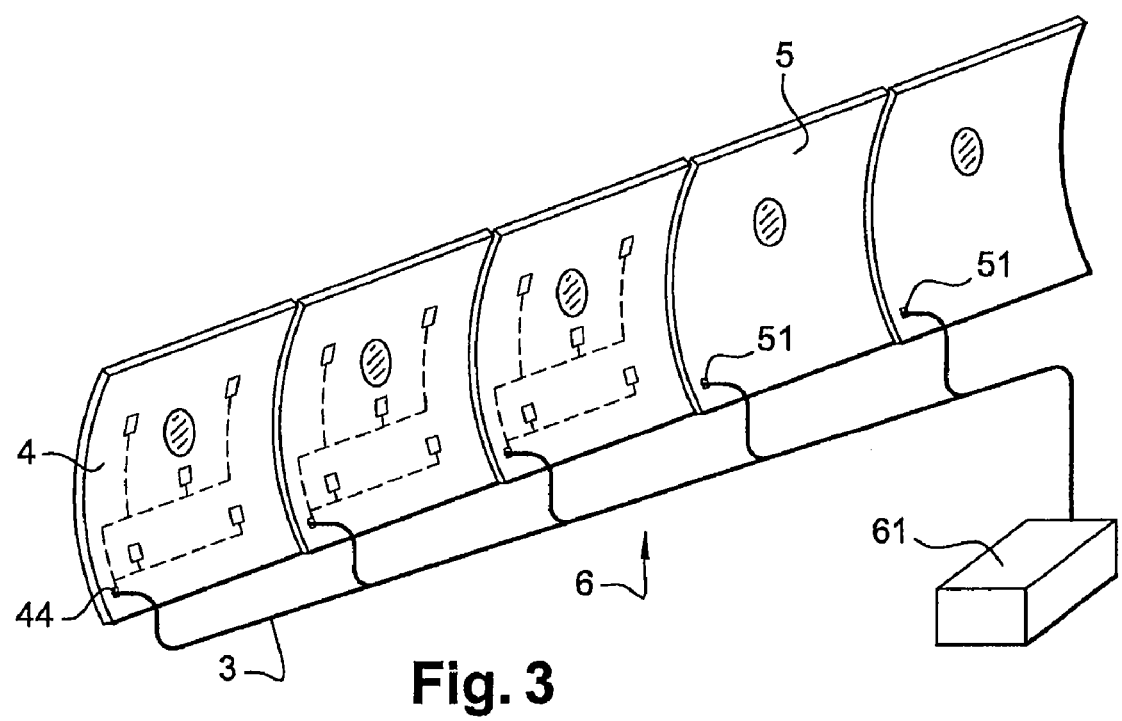
FIG. 3: an overall view of the device with panels representing one side of an aircraft cabin.

Referring to FIG. 3, the system 61 for supplying power to active panels, the electrical cabling 3 and the active panels 4 form a system 6 for active noise control in the cabin 2.

The term "cabin" should be understood for the application of the present invention to mean all the space of an aircraft 1 in which a reduced noise level is generally desired due to the possible presence of people in said space. The term "cabin" thus relates to either a passenger cabin, a cockpit, a rest area for the crew or any equivalent area.

Figure 2:
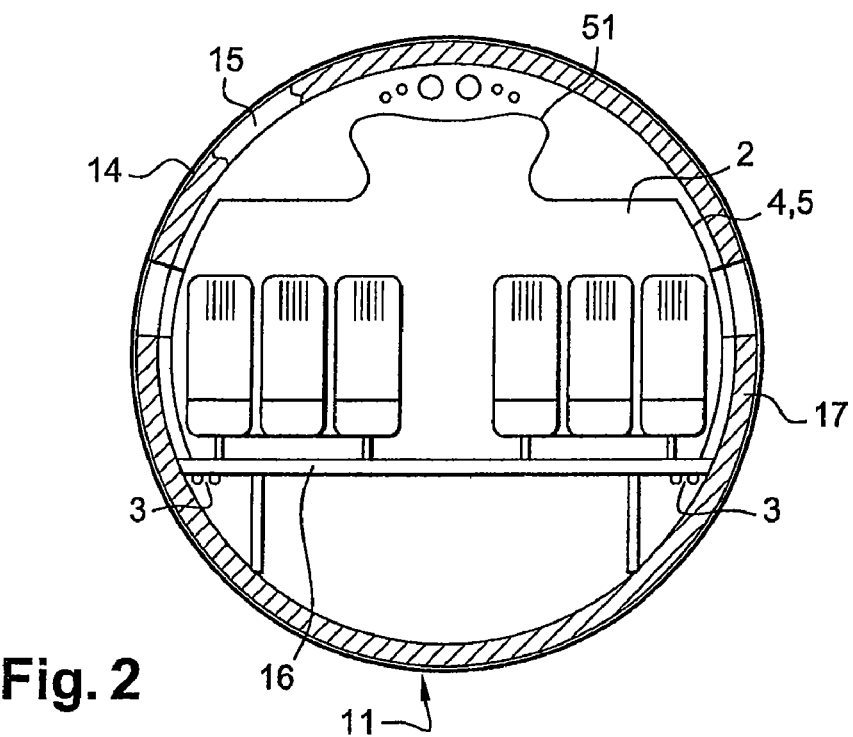
FIG. 2: an example of a cross section through a fuselage illustrating the main elements of a cross section.

Very often, as illustrated in FIG. 1 and in FIG. 2 by way of nonlimiting example, the cabins 1 in current aircraft are mainly spaces made in a fuselage 11 comprising an approximately cylindrical area between a nose cone 12 and a tail cone 13, both of which are of tapered form.

For aircraft having nonconventional designs, which are not shown, cabins 1 are if necessary spaces made in other areas of the aircraft, such as in a wing of an aircraft of flying wing design.

As can be understood from reading the embodiment of the invention described, the invention can be applied to a cabin of any type of shape, in an aircraft of conventional or nonconventional design, by making adaptations within the skill of a person skilled in the art.

FIG. 2 illustrates an example of a general cross section through a cabin 2 in a cylindrical fuselage 11.

Such a cross section shows that the fuselage 11 comprises an external structure comprising a lining 14 fixed to structural framework elements 15, a structure forming the floor 16 of the cabin 2 and various fittings.

Among the fittings, trim panels 4, 5 of the cabin 2 are arranged on the side walls of said cabin in order to give the cabin a satisfactory appearance and in order to separate a living space of the cabin 2 from the structure of the fuselage 11.

The trim panels 4, 5 are in practice fixed very close to the framework elements 15 of the fuselage 11 so as not to disadvantageously affect the volume of the cabin 2 available to the occupants of said cabin.

In order to provide a degree of thermal insulation with regard to the structure which is relatively cold due to its direct contact with the outside air, the space between the lining of the fuselage and the panels and between the framework elements, which are in any case at a greater or lesser distance from one another, is partially filled with blankets 17 of glass wool.

The electrical cabling 3 of the system 6 for active noise control is arranged to distribute power to the active panels 4 along the walls of the cabin at any point where an active panel 4 is actually fitted and also at any point where an active panel is likely to be fitted.

In practice, and to meet the requirements of installing any possible arrangement for a cabin, the electrical cabling 3 is designed, as illustrated in FIG. 3, by taking into consideration the fact that all the trim panels, active 4 and passive 5, except for those which should be considered as never having to correspond to active panels, are active panels.

As illustrated in FIG. 2, electrical cabling 3 of the active control system advantageously comprises cables fixed close to the side trim panels 4, 5 of the cabin 2, for example running under the floor 3 of the cabin close to the walls of the fuselage covered with said trim panels.

Other routes are, of course, possible, for example between the structure of the fuselage and the side trim panels 4, 5 or above the ceiling trim panels 51, depending in particular on mass criteria of the electrical installation in question and on the compatibility with other electrical systems, not shown, of the aircraft.

At one end of the cabling opposite the ends that can be connected to the active trim panels, the cabling is connected to the system 61 supplying power to the active panels.

In a known manner in a system for active noise control, the system 61 supplying power to the active panels receives signals coming from sensors 7, for example accelerometers measuring acoustic vibrations distributed within the aircraft, and generates a signal to supply power to actuators 8 integrated in the active trim panels 4, said actuators being able to make said panels vibrate.

The characteristics of the power supply signal are matched to the technology of the actuators, for example piezoelectric actuators requiring a relatively high voltage amplifier 63, and the signal is modulated in phase and amplitude depending on the signals received from the sensors 7 following processing of said signals which is carried out for example by means of a processor 62.

In the present invention, the cabling necessary for the sensors 7 to operate and for the transmission of the measurement signals, which cabling may utilize any type of technology, for example optical cables for transmitting measurement signals, is advantageously integrated in the electrical cabling 3 of the system for active noise control, it being possible, however, for the routes of the measurement signals to be at a greater or lesser distance from those of the power supply signals.

Figure 4:
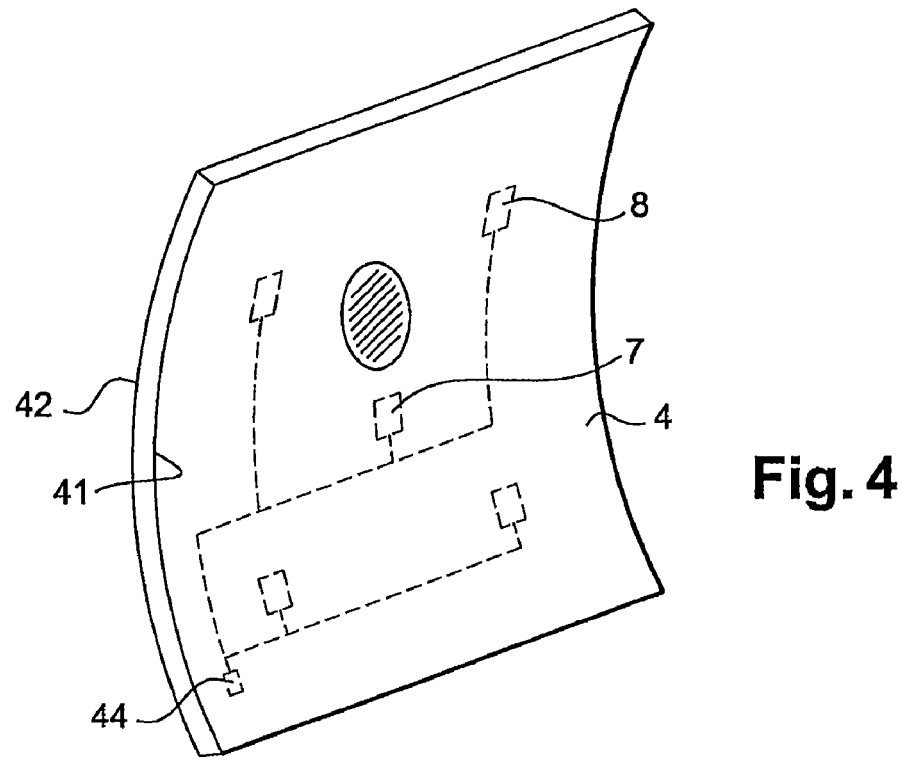
FIG. 4: an example of an active trim panel used for implementing the invention.
Figure 5:
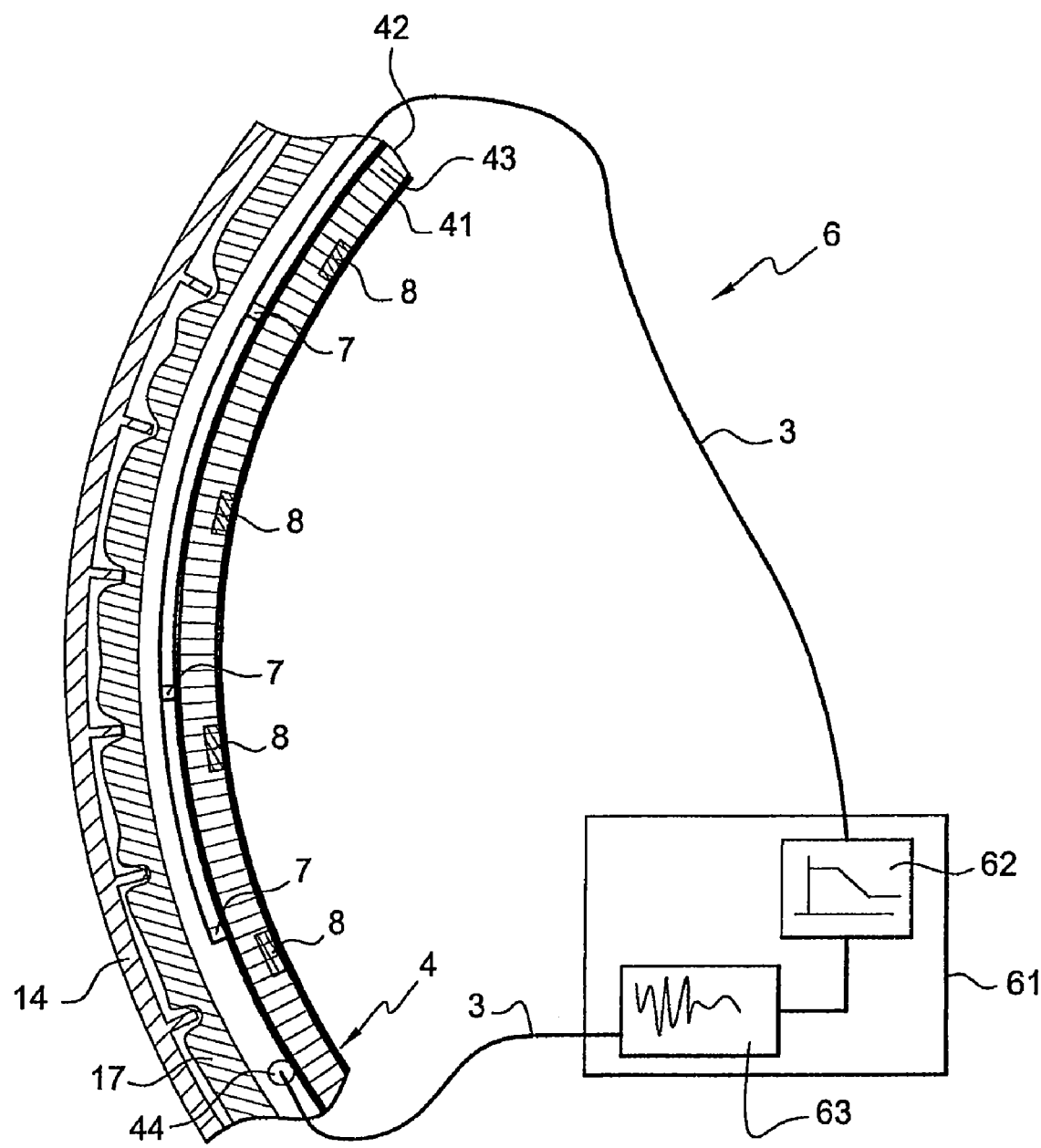
FIG. 5: a functional diagram of the device illustrated in a partial cross section through a wall of the fuselage.

In order to implement the invention in accordance with a preferred embodiment, an active trim panel 4, as illustrated in FIG. 4 or FIG. 5, comprises a lining 41, for example a lining of a sandwich panel structure having a cellular core 43, located next to the cabin 2, on one face of which lining, not visible from the cabin, actuators 8 are fixed, advantageously piezoelectric actuators integrated into the thickness of the active trim panel 4.

Advantageously, at least some of the sensors 7 necessary for the system 6 for active noise control to operate are integrated into the thickness of the active trim panel 4 or if appropriate fixed on a face 42, not visible from the cabin, of said panel as illustrated for example in FIG. 5.

In other embodiments, not shown, of the invention, the sensors 7, or at least some of them, are distributed, depending on the desired performance of the system 6 for active noise control, around the cabin on structures or trim panels other than the active trim panels 4.

Preferably, all the connections with the actuators and/or the sensors of an active trim panel 4 are grouped together at a single connector 44 secured to the panel 4, or if appropriate at a limited number of connectors, for example one connector for the actuators and one connector (not shown) for the sensors, thereby enabling the strong signals to be separated from the weak signals.

In order to enable mechanical interchangeability between the active panels 4 and the passive panels 5, the two types of panel are produced with the same geometric dimensions and advantageously using the same structural technologies, in particular a sandwich panel structure comprising linings of composite material and a cellular core such as what is known as a honeycomb core, this solution being known for producing passive trim panels.

Advantageously, as illustrated in FIG. 3, the passive panels 5 comprise dummy connectors 51, that is to say non-operational connectors, able to be used as a mount for the sockets of the electrical cabling 3 of the active control system in order that said sockets, which are not in use when the panel is a passive panel 5, can be held effectively with no risk of being damaged or of damaging another element of the aircraft 1.

The aircraft 1 according to the invention is thus able to be equipped, in any location previously determined as likely to receive an active panel in a particular configuration of the aircraft, with either an active panel 4 or a passive panel 5. In addition, an active panel 4 intended for a given location may be a different model, in particular having a different number and arrangement of actuators 8 or of sensors 7 depending on the performance desired.

Depending on the general fitting-out of the cabin 2, for example the presence of galley kitchens, or depending on the level of acoustic comfort desired, which may vary depending on the category of the cabin or on the intended length of flights, the aircraft 1 comprises an adjusted distribution of the number and type of active panels 4 of different standards and of the number and type of passive panels 5.

The conversion of a cabin 2 with regard to its level of acoustic comfort is thus carried out by replacing the active panels with passive panels 5 or with active panels having a different performance and/or by replacing passive panels with mechanically interchangeable active panels 4 and by connecting the connectors 44 of the active panels to the cabling 3 of the system supplying power to the active panels and/or by fixing the standby sockets of the cabling 3 to the dummy sockets 51 on the passive panels.

In practice it is not necessary to perform any significant modification of the cabling 3 during the conversion of the cabin and the system 6 for active noise control in the cabin is turned on by acting on the configuration of the power supply means 61 for the actuators of the panels and the processing of the signals from the sensors, very often by modifying the configuration of software supervising the operation of the system for active noise control.

It is understood from the description of the embodiment of the invention that the device may be produced with any type of cabin trim panel, for example ceiling panels.

The invention claimed is:

1. A method of modifying an acoustic comfort of an aircraft cabin of an aircraft, at least a part of the aircraft cabin being delimited by trim panels, the aircraft cabin comprising a system for active noise control of ambient noise inside the aircraft cabin, the method comprising:
 converting between a first configuration of the aircraft cabin and a second configuration of the aircraft cabin, wherein:
 in the first configuration at least one trim panel of the trim panels is an active panel having actuators powered by the system for active noise control, said active panel being connected to a cabling for supplying power to the active panel, said cabling being arranged in the aircraft to power each active panel installed in the first configuration of the aircraft cabin by a power system for supplying power to each active panel,
 in the second configuration the at least one trim panel of the trim panels is a passive panel without any actuators,
 during a conversion from the first configuration to the second configuration, the active panel is removed and the passive panel is substituted for the active panel for the at least one trim panel, with which it is mechanically interchangeable, each removed active panel being disconnected from the system for active noise control and the cabling powering each removed active panel remaining on board of the aircraft, the cabling for supplying power to the removed active panel which is substituted by the passive panel being fixed by a socket on a dummy connector of the passive panel, and
 during a further conversion from the second configuration to the first configuration, the passive panel is removed and the active panel is substituted for the passive panel, with which it is mechanically interchangeable, and is connected to the system for active noise control by the cabling on board of the aircraft.

2. A method as in claim 1 wherein during the further conversion the active panel is selected from among a set of mechanically interchangeable panels having different noise attenuation capability depending upon predetermined acoustic comfort levels.

3. A method as in claim 1 wherein the power system for supplying power to each active panel is configured depending upon an effective capability of each connected active panel.

4. An aircraft having at least one cabin, at least a part of the cabin being delimited by trim panels, the cabin comprising a system for active noise control of noise inside the cabin, wherein:
 each trim panel of the cabin is an active panel comprising actuators powered by the system for active noise control, or a passive panel without any actuators, the passive panel being mechanically interchangeable with the active panel;

a cabling for supplying power to each active panel is arranged in the aircraft to power all active panels that can be installed for said cabin;

a power system for supplying power to each active panel on board of the aircraft is connected to the cabling for supplying power to each active panel; and the passive panel for at least one of the trim panels is installed in the cabin at a position where it is configured to be substituted by the active panel, and comprises at least one dummy connector to which is secured a connector of the cabling for supplying power the active panel.

5. An aircraft as in claim 4 wherein the cabling for supplying power to each active panel comprises wires to connect sensors of the system for active noise control to the power system.

* * * * *

UNITED STATES PATENT AND TRADEMARK OFFICE
CERTIFICATE OF CORRECTION

PATENT NO. : 8,376,262 B2 Page 1 of 1
APPLICATION NO. : 12/668118
DATED : February 19, 2013
INVENTOR(S) : Benoit Petitjean It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

First Day of September, 2015

Michelle K. Lee
*Director of the United States Patent and Trademark Office*